(12) United States Patent
Litwiller et al.

(10) Patent No.: US 6,838,975 B2
(45) Date of Patent: Jan. 4, 2005

(54) RETRACTABLE PIN ARRAY IDENTIFICATION APPARATUS AND METHOD

(75) Inventors: Debora Margaret Hejza Litwiller, Rochester, NY (US); Philip E. Blair, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 422 days.

(21) Appl. No.: 10/022,914

(22) Filed: Dec. 20, 2001

(65) Prior Publication Data

US 2003/0117265 A1 Jun. 26, 2003

(51) Int. Cl.$^7$ .............................................. G05B 23/02
(52) U.S. Cl. .................. 340/5.67; 340/5.61; 340/686.2; 340/626; 340/825.56; 340/5.65; 70/278.2; 70/278.3; 439/44
(58) Field of Search ............................... 340/5.67, 5.61, 340/686.2, 626, 825.56; 70/278.2, 278.3; 235/453; 439/23, 44, 46, 49

(56) References Cited

U.S. PATENT DOCUMENTS 6,696,970 B2 * 2/2004 Litwiller et al. ......... 340/686.2

* cited by examiner

Primary Examiner—Michael Horabik
Assistant Examiner—Vernal Brown
(74) Attorney, Agent, or Firm—Fay, Sharpe, Fagan, Minnich & McKee, LLP (57) ABSTRACT

An identification apparatus comprising an array of retractable conductive pins on a base component placed onto a primary device and in communication therewith. A set of shaped identifiers have a plurality of holes through which respective pins on the array of retractable pins pass, each identifier being uniquely configured with at least one distinct location containing a conductive plug or 'cap' fitted therein which blocks the passage therethrough of that particular pin thereby forcing said pin to retract into the base component to block further use of that pin by subsequently placed identifiers. Each retractable pin is in individual communication with the primary device such that, once one or more identifiers have been placed onto the pin array, the primary device can thereafter identify the placed identifiers so as to subsequently perform certain functions or other desired operations based on the type, configuration, and/or number of identifiers placed thereon.

10 Claims, 5 Drawing Sheets

| [R,C] |
|---|
| [2,3] |
| [2,4] |
| [2,5] |
| [3,3] |
| [3,5] |
| [6,4] |

RETRACTABLE PIN ARRAY IDENTIFICATION APPARATUS AND METHOD

RELATED CASES

The present invention is related to concurrently filed and co-pending U.S. patent application Ser. No. 10/022,915; and 10/022,900, and to concurrently filed application Ser. No. 10/022,911 (U.S. Pat. No. 6,750,755); and 10/022,913 (U.S. Pat. No. 6,696,970), each of the above being incorporated herein by reference.

FIELD OF THE INVENTION

This invention is related in general to keying devices and other apparatus which can identify an end-user when properly fitted thereon and, more particularly, to those apparatus attached having an array of pins attached to a base component and requiring the physical attachment onto said array of pins one or more shaped keyed objects such that each object allows the physical passage of pins to pass therethrough.

BACKGROUND OF THE INVENTION

It is often required in the security field to secure doors and other equipment from access or usage by unauthorized persons. Typically, a magnetic card is swiped through a reader mechanism in order to identify the user requesting access or usage. Often, these magnetic cards are subject to being inadvertently erased by coming in close proximity with or otherwise physically touching a magnetic field or source thereby disabling the card from proper usage. Keys can also be utilized to permit access through certain doors but keys can be bent or broken thereby rendering them useless as well.

In addition, it is often necessary to physically attach one or more secondary devices to a primary device as accessory apparatus prior to the primary device's initialization and subsequent proper operation. In most instances, a machine is delivered to the end-user or customer with some assembly being required to be performed by the customer. It often is not possible for the devices' manufacturer's technical representatives to be present to monitor and otherwise ensure that secondary device attachment and installation to the primary device has been performed properly in advance of the machine's operation. Incorrect assembly can cause damage to the machine and/or cause injury to the customer. In addition, the primary device may configure itself differently depending on which accessory or secondary devices have been attached thereto. In the instance wherein the primary device is a copier machine, one particular or alternate configuration may be required of the primary device if there are more than one input paper trays attached thereto or multiple output trays attached thereto. As such, the primary device may need a user-friendly and quick method of determining which accessory devices have been attached.

What is needed in the arts is an identification apparatus which cannot be easily erased or broken and which, when placed onto a pin array of a primary device enables the primary device to identify the user requesting access or to identify which accessory devices have been connected or otherwise attached thereto.

SUMMARY OF THE INVENTION

What is disclosed herein is an identification apparatus comprising an array of retractable conductive pins on a base component placed onto a primary device and in communication therewith. A set of shaped identifiers having a plurality of holes through which respective pins on the array of retractable pins pass. Each identifier being uniquely configured with at least one distinct location containing a conductive plug or 'cap' fitted therein which blocks the passage therethrough of that particular pin thereby forcing said pin to retract into the base component to block further use of that pin by subsequently placed identifiers. Each retractable pin is in individual communication with the primary device such that, once one or more identifiers have been placed onto the pin array, the primary device can thereafter identify the placed identifiers so as to subsequently perform certain functions or other desired operations based on the type, configuration, and/or number of identifiers placed thereon.

More particularly, what is disclosed is a base component comprising an array of retractable pins. A keyed center post fixed to the base component is utilized thereon to ensure proper orientation and placement of the identifiers onto the array of retractable pins. Individual identifiers are preferably made of a nonconductive material are also disclosed wherein each identifier comprises an array of holes each in alignment with a pin in the pin array of the base component. A keyed center hole in each identifier having a conductive sleeve is provided through which the keyed center post passes. Each identifier is specifically and uniquely configured with at least one conductive cap placed in a predetermined hole or pattern of holes which prevents the passage therethrough of a pin such that no two caps on separate identifiers contact the same pin when fitted onto the pin array. Wiring associated with each identifier electrically connects each conductive cap with the conductive cap the positioned around the identifier's keyed center hole. A closed circuit is enabled between the primary device up through wiring leading to each individual pin, through each pin/cap contact, through the wiring associated with that identifier and over to the center alignment post/sleeve contact, down through the center pin itself and back.

A method is also disclosed wherein the primary device can determine which identifiers have been placed onto the pin array comprising the first step of polling the individual pins in the array of retractable pins and determining which pins have closed circuit configurations. The detection process preferably returns a set of pin/cap locations in [row, column] format which defines the locations of the individual pins on the pin array. A first location is then extracted from the returned set of detected locations. Known identifiers and their defined set of pin/cap locations stored in a database of known identifiers are selected which have a location matching the first extracted detected location's [row, column] values. Identifiers which have one location matching the extracted detected location are then retrieved from the database of known identifiers as candidates requiring further analysis. For each of the determined identifiers retrieved from the database of stored identifiers and their respective pin/cap [row, column] locations, a process would then step through the stored locations for each of the retrieved identifiers and, through a comparison technique, determine which specific identifier has all of its stored locations in common with locations in the set of detected locations. Since, no two identifiers, when pressed onto the pin array, are allowed to utilize the same pin/cap location, the full set of locations for one of the retrieved stored identifiers will be a subset of the set of detected locations. If one location from the set of stored locations for any of the retrieved identifiers does not match any of the locations from the set of detected locations, then that identifier is thrown out or otherwise considered not to be a match and is therefore not one of the identifiers which has been fitted onto the pin array. When it is determined by comparison that each location contained in the entire set of a retrieved identifier's locations have a match in the set of detected locations, then that identifier is acknowledged and those matching locations in the set of detected locations are then flagged as having been accounted for or are alternatively removed from the set of detected locations. The set of detected locations would now contain remaining detected locations for other identifiers to be matched with. The process repeats itself by then extracting another location from the set of detected locations. Identifiers in the database of stored identifiers are retrieved which have one location matching the extracted location. For each location in the set of each of the retrieved identifiers, a comparison is made to again determine which retrieved identifier's set of stored locations is considered a subset of the set of remaining or non-flagged detected locations. Identifiers are thrown out which do not have a complete match and a single identifier is identified which has all of its stored locations matching locations within the set of detected locations. This identifier is then otherwise acknowledged. Those matching locations within the set of detected locations corresponding to the recently acknowledged identifier are then flagged as having been accounted for or are alternatively removed from the set. The process again repeats itself until the set of detected locations is empty, i.e., all detected locations have been accounted for and all the identifiers have been acknowledged. In the instance wherein no match can be found in the database of stored identifiers and their respective pin/cap locations for one or more detected locations in the set of detected locations, an alarm condition can be set or a predefined set of processes and/or procedures can alternatively be initiated to indicate a fault condition.

Advantages of the present invention, as described herein, may be realized and otherwise obtained by means particularly pointed out and distinctly claimed in the appended claims, taken in conjunction with the accompanying drawings and detailed specification.

DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

What is disclosed herein is an identification apparatus comprising an array of retractable conductive pins on a base component placed onto a primary device and in communication therewith. A set of shaped identifiers having a plurality of holes through which respective pins on the array of retractable pins pass. Each identifier being uniquely configured with at least one distinct location containing a conductive plug or 'cap' fitted therein which blocks the passage therethrough of that particular pin thereby forcing said pin to retract into the base component to block further use of that pin by subsequently placed identifiers. Each retractable pin is in individual communication with the primary device such that, once one or more identifiers have been placed onto the pin array, the primary device can thereafter identify the placed identifiers so as to subsequently perform certain functions or other desired operations based on the type, configuration, and/or number of identifiers placed thereon.

Figure 1:
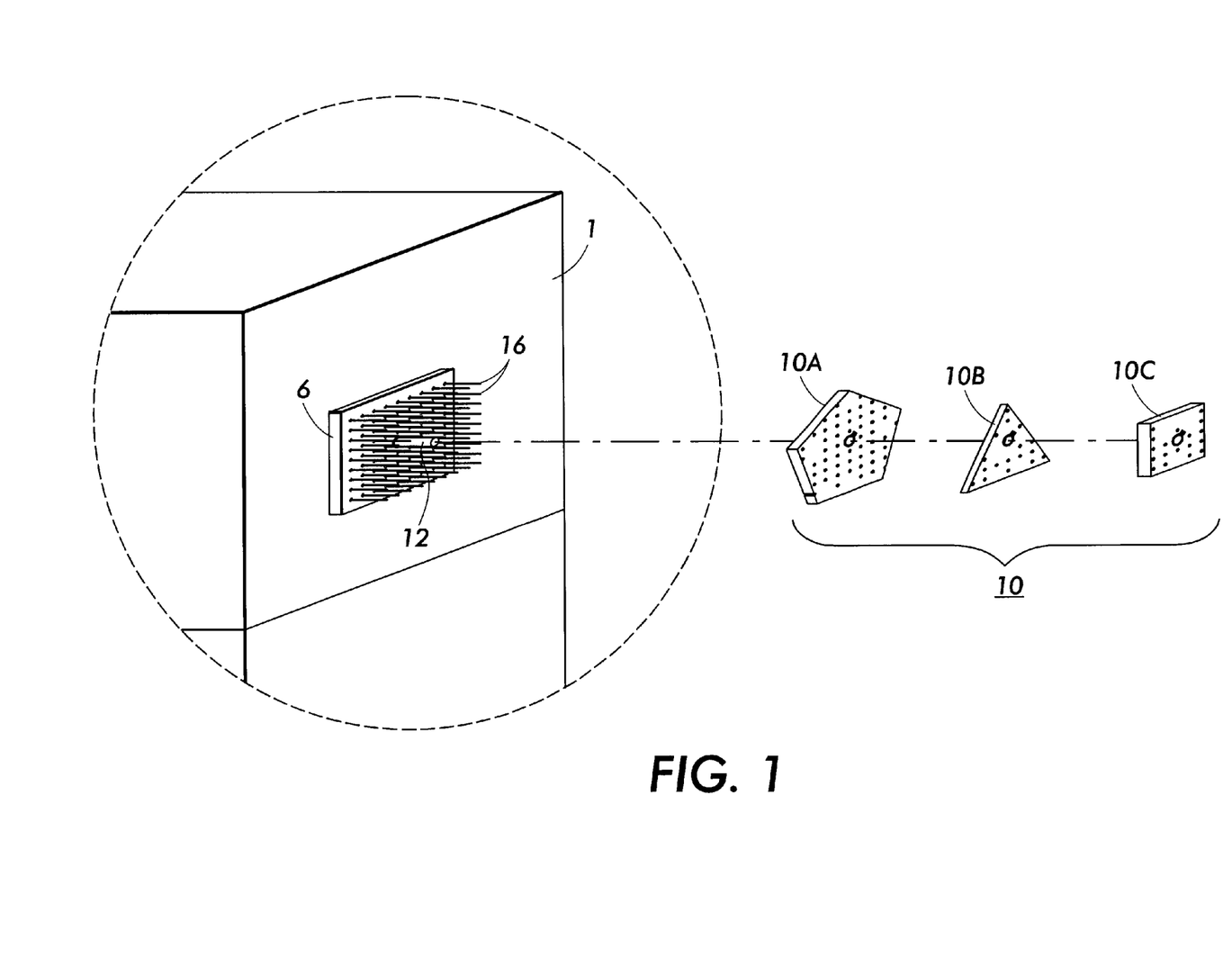
FIG. 1 shows a subsection of a primary device 1 upon which a base component 6 comprising a keyed center alignment post 12 and an array of retractable pins 16 and which illustrates the method of attaching shaped identifiers shown collectively at 10 and individually at 10A, 10B, and 10C onto the pin array.

Attention is directed to FIG. 1 which shows a subsection of a primary device 1 upon which a base component 6 comprising a keyed center alignment post 12 and an array of retractable pins 16 and which illustrates the method of attaching shaped identifiers collectively at 10 and individually as 10A, 10B, and 10C onto the pin array of the base component. Primary device 1 can be any device with multiple secondary devices attached each of which serve an intended purpose or which are required for the proper configuration and subsequent operation of the primary device. This would be in the instance wherein the primary device is, for example, a copier machine which arrives at the customer's business or office separated from one or more secondary devices each requiring physical attachment to or configuration with the primary device prior to the primary device's startup and proper operation. One such secondary device, for example, could be a paper tray while another secondary device, for example, would be a paper input device, and a third secondary device could perhaps be a specific type of output tray. Each secondary device would arrive with its own identifier, in FIG. 1 shown as in pentagonal, triangular, and rectangular shapes which, when placed onto the pin array of the base component of the primary device indicates to the primary device that the corresponding secondary device has been installed. The primary device could then configure or re-configure itself to begin operation with the attached set of known secondary devices. In practice, the end-user or installation technician would take a first secondary device and physically attach it to the primary device and, thereafter, fit that particular secondary device's corresponding identifier onto the pin array of the base component, using keyed center post 12 or other alignment means in order to facilitate the proper orientation and placement thereon. Likewise, the end-user or installation technician would then physically attach another secondary device to the primary device and, thereafter, fit that secondary device's corresponding identifier onto the pin array of the base component. The process would be repeated until all required or otherwise desired secondary devices have been physically attached or have been placed in communication with or configured with the primary device and each secondary device's associated shaped identifier has been fitted onto the base component's array of retractable pins.

In such a manner and in accordance with the teachings of the present invention to be discussed further herein, the primary device is able to identify which specific secondary devices it has available to it. If, in the instance wherein the sufficient number of secondary devices required for the proper or safe operation of the primary device have not been attached then the primary device can signal the end-user or installation technician that some secondary device or devices are missing or that the primary system has not yet been fully configured with all intended attachments.

Alternatively, the installation technician could be in possession of a specific identifier which, when placed onto the pin array of the base component of the primary device, indicates to the primary device that the technician requires access to certain previously non-accessible components or that the technician is intending to perform certain service operations on the primary device. Upon placement onto the pin array of the technician's specific identifier, the primary device would recognize the technician and/or the specific operation desired to be performed and allow such maintenance to be done or perform intended certain operations.

Alternatively, the primary device could be a secured entryway, locked passageway, or security door blocking entrance into a room or building in which access is restricted to certain individuals. An individual in possession of, for example, the pentagonal shaped identifier of FIG. 1 which, when placed upon the pin array of the door's base component, would be granted access therein with or without being limited or restricted to accessing further areas inside the room or building. In this same example, an individual in possession of, for example, the triangular identifier of FIG. 1 which, when said identifier is placed by that user onto the pin array of the door's base component would be granted different and perhaps further access rights therein while individual's with the square identifier being treated differently. The primary device could be configured to do one or more internal operations once the identifier placed on the pin array has been accepted and perhaps a user pin number or security code being further required for an additional measure of security.

It should be understood that the present invention can find its uses in many differing applications and the examples provided above are intended to be exemplary and are not to be considered limitations of the embodiments disclosed. As such, FIG. 1 is primarily for illustrative purposes and is not intended to serve in any way as a limitation.

Preferably, the primary device's CPU is located within the confines of the primary device although it should be understood that the base component of the present invention can be in communication with a CPU via a network or other signal or communication transmission means. One skilled in the art should understand that, in the instance wherein the base component of the present invention is using signal transmission means to communicate with a CPU, antenna means and supporting communication send/receive circuitry means would additionally be required in order to enable or otherwise facilitate the communication therebetween.

Furthermore, it should also be understood that attachment of the base component of the present invention to the primary device is not limited to any particular location on the primary device but rather the location of the base component will be more of a design constraint depending on the type of primary device and the kinds of access or functionality intended by implementation thereof.

Figure 2:
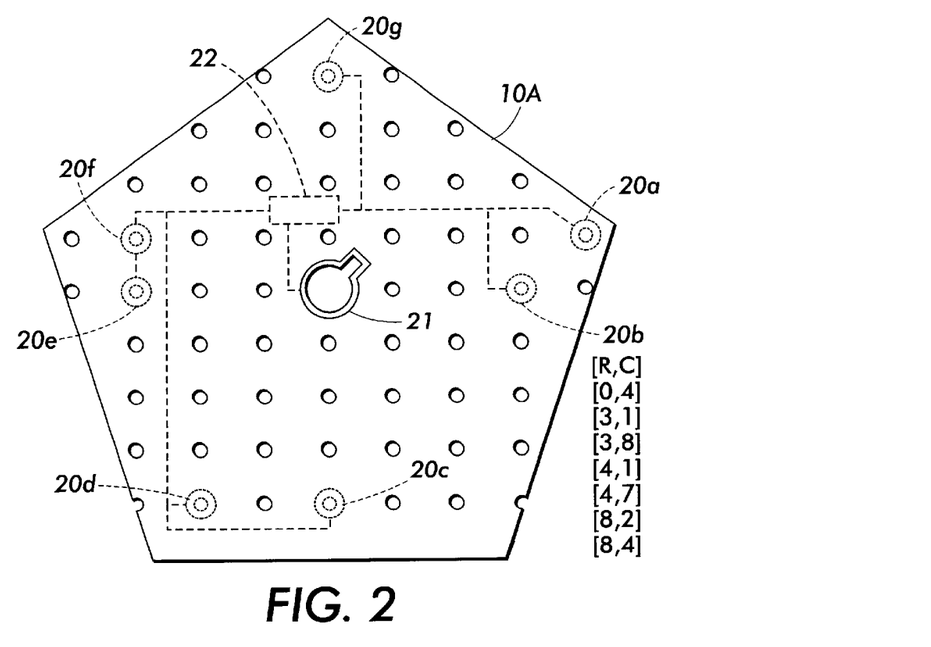
FIG. 2 is a top view of a pentagonal shaped identifier 10A of FIG. 1 illustrating a slot for the passage of the keyed center alignment post and a certain configuration of caps fitted therein which prevent the passage of the pin therethrough wherein said configuration is distinct from the configuration of the identifiers of FIGS. 3 and 4.
Figure 3:
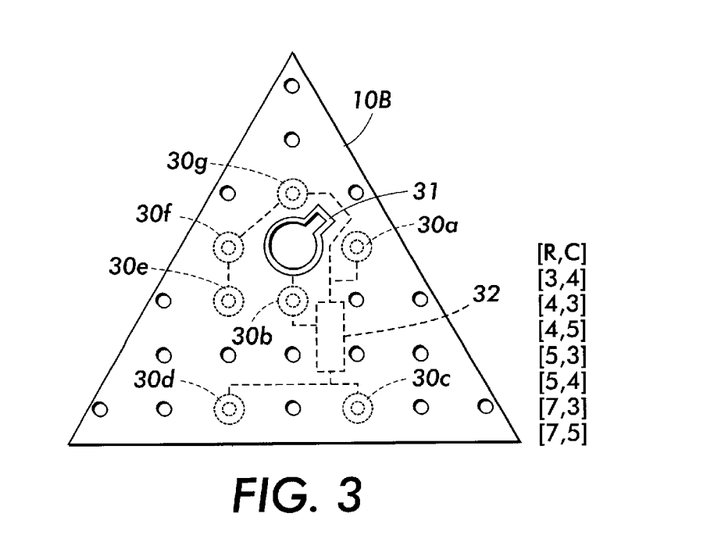
FIG. 3 is a top view of the triangular shaped identifier 10B of FIG. 1 illustrating a slot for the passage of the keyed center alignment post and having a configuration of caps fitted therein which prevent the passage of the pin therethrough wherein said configuration is distinct from the configuration of the identifiers of FIGS. 2 and 4.
Figure 4:
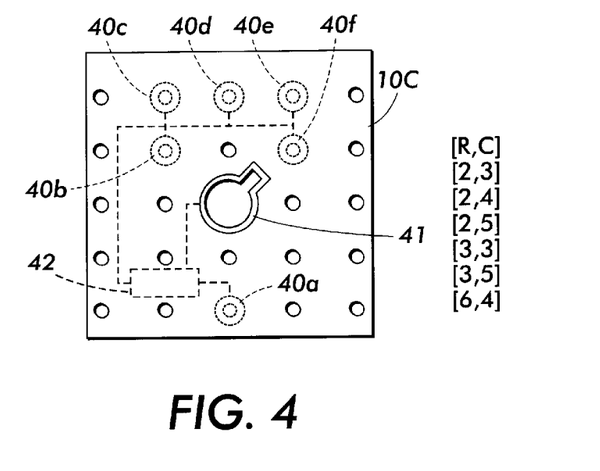
FIG. 4 is a top view of the rectangular shaped identifier 10C of FIG. 1 illustrating a slot for the passage of the keyed center alignment post and having a configuration of caps fitted therein which prevent the passage of the pin therethrough wherein said configuration is distinct from the configuration of the identifiers of FIGS. 2 and 3.

Attention is now directed to FIGS. 2–4 wherein FIG. 2 shows a slot for the passage of the keyed center alignment post and a certain configuration of caps fitted therein which prevent the passage of the pin therethrough wherein said configuration is distinct from the configuration of the identifiers of FIGS. 3 and 4. Likewise, FIG. 3 is a top view of the triangular shaped identifier 10B of FIG. 1 illustrating a slot for the passage of the keyed center alignment post and having a configuration of caps fitted therein which prevent the passage of the pin therethrough wherein said configuration is distinct from the configuration of the identifiers of FIGS. 2 and 4. Lastly, FIG. 4 is a top view of the rectangular shaped identifier 10C of FIG. 1 illustrating a slot for the passage of the keyed center alignment post and having a configuration of caps fitted therein which prevent the passage of the pin therethrough wherein said configuration is distinct from the configuration of the identifiers of FIGS. 2 and 3.

It should be pointed out that other configurations of the keyed center post, such as having multiple keys or specific shapes are envisioned herein and are intended to be considered within the scope of the present invention. In another embodiment envisioned herein, the base component and the individual identifiers have at least one edge which can be readily identified by color, shape, or other markings thereon such that the person placing the identifier onto the array of pins can properly orient the identifiers prior to pressing the identifier onto the retractable pins.

The identifiers illustrated therein are specifically configured with an array of holes having a one-to-one correspondence with the array of retractable pins 16 of FIG. 1 associated with the base component. The diameter of the individual holes, fitted with caps or otherwise, is such that each permits an individual pin to enter and contact said cap or pass completely therethrough when an identifier is pressed onto the pin array. Also shown are pre-selected locations on each identifier wherein caps have been fitted as shown in FIG. 2 at 20a–g, in FIG. 3 at 30a–g, and in FIG. 4 at 40a–f. In the embodiments shown, non-capped holes in the identifiers allow the pins to pass through the body of the identifier unobstructed and locations wherein caps have been fitted do not allow the passage of the pin therethrough but rather cause the pin to retract into the base component in order to prevent subsequently placed identifiers from utilizing that particular pin. Each capped location comes in physical contact with their respective pin. The caps and the pins preferably are comprised of a conductive material such that individual pins come in physical contact with a fitted cap in order to allow electrical communication between that pin/cap combination. Although the identifiers illustrated in FIGS. 2–4 are configured with a plurality of caps it should be understood that the number of caps per identifier is a design choice so long as any particular identifier has at least one cap in contact with one pin such that the primary device can ascertain which particular identifiers have been fitted onto the pin array of the base component.

The sleeve around the larger center post, shown in FIG. 2 at 21, in FIG. 3 at 31, and in FIG. 4 at 41 is also preferably made of a conductive material in order to enable communication with keyed conductive center post 12. Keyed conductive center post 12 is also in electrical communication with the primary device. In this embodiment, the remaining body of the identifier itself, or a portion thereof, would comprise a non-conductive material in order to prevent undesired cross-communication between adjacent identifiers and between pin/cap contacts in the instance wherein it is intended that each be electrically isolated.

Shown within each identifier are wires, indicated as dotted lines, which enable each cap to communicate with the center post. In such a fashion, a closed circuit is enabled between the primary device up through each pin and through each pin/cap contact, through the indicated wires internally associated with each identifier and over to the center sleeve/post contact, down through the conductive center pin itself and back to the primary device. Also shown in FIG. 2 specifically at 22, is an alternative embodiment wherein internal circuitry is additionally configured within the body of the identifier or associated therewith in order to enable additional functionality or otherwise communicate specific information to the primary device. This is also illustrated at 32 in FIG. 3 and at 42 in FIG. 4.

Figure 5:
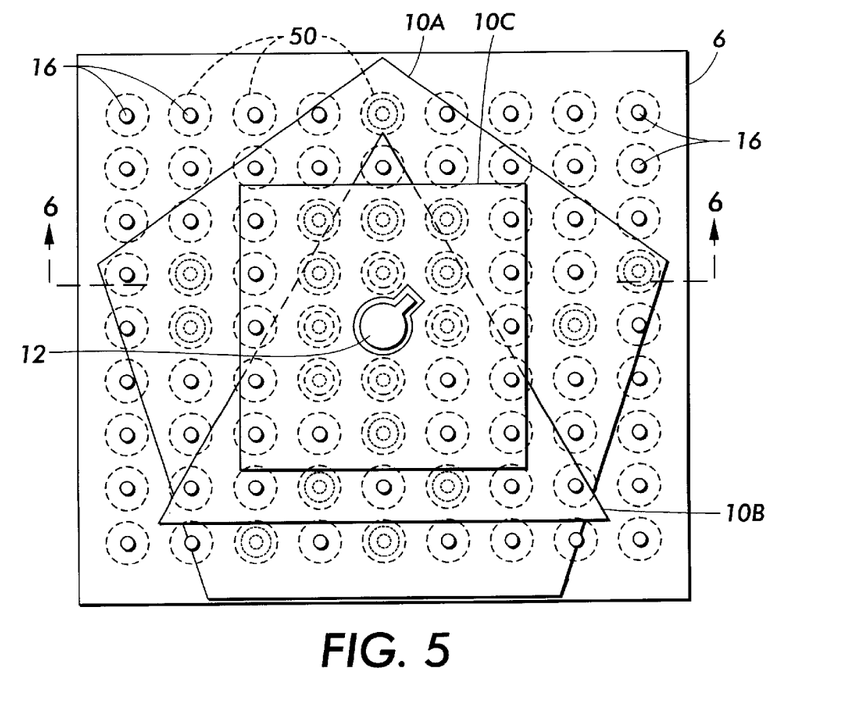
FIG. 5 is a top view of the base component 16 of FIG. 1 whereupon identifiers 10A, 10B, and 10C have been placed while indicating the location and direction of the cross-sectional view shown in FIG. 6.
Figure 6:
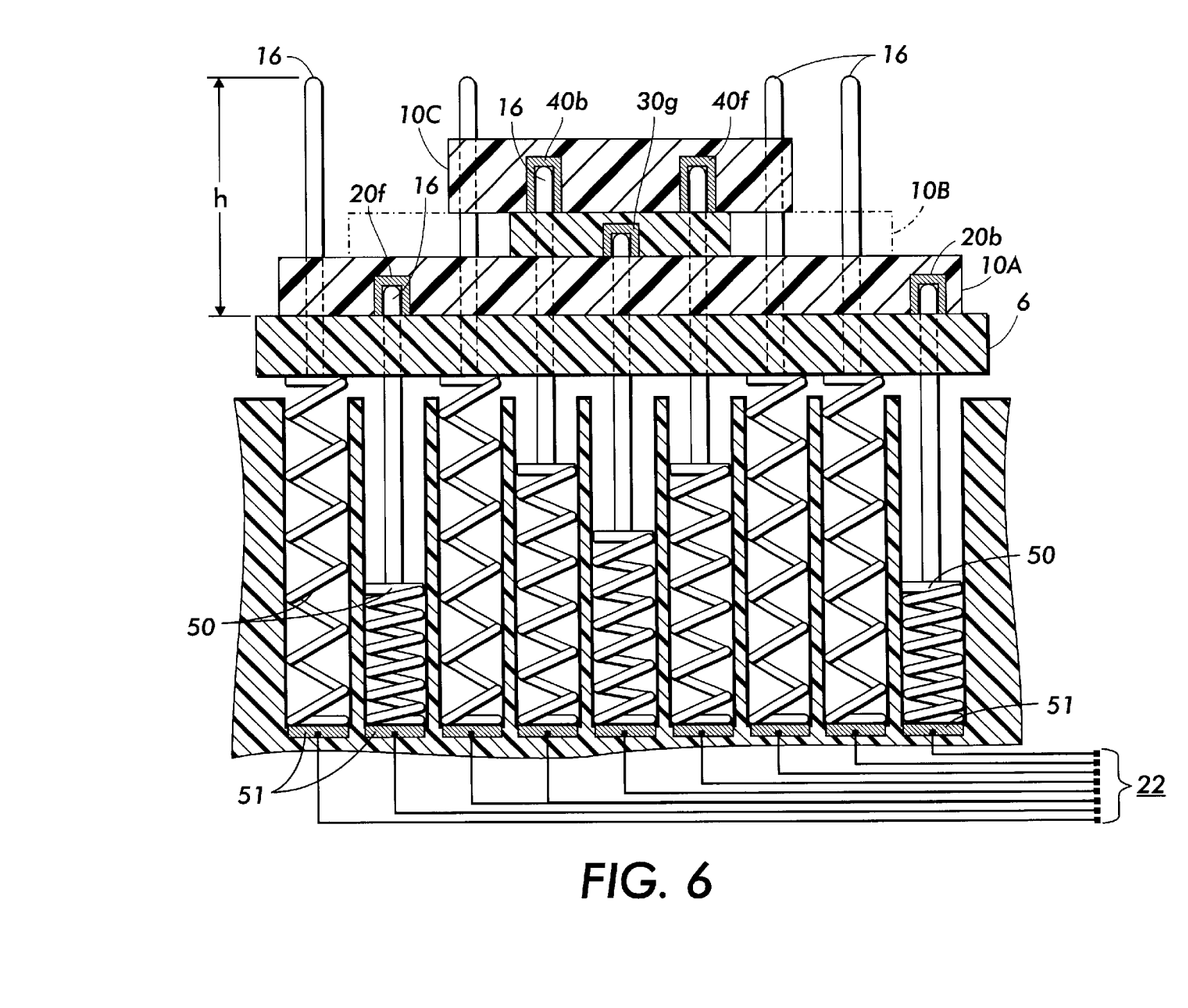
FIG. 6 illustrates the cross-sectional view of FIG. 5 in order to show that, preferably, height 'h' of the base component's pin array is sufficient to hold the individual identifiers 10A, 10B, and 10C, fitted thereon shown alternatively with varying degrees of thickness and to show communication means, collectively at 22; and to show the retractable nature of each pin in the array of pins.

Although it may not be obvious upon first glance, the identifiers illustrated in FIGS. 2–4 have been configured such that no two caps of separate identifiers contact the same pin along the pin's vertical axis. It is intended herein with this particular embodiment that each identifier have unique pin/cap combination configurations such that no two identifiers utilize the same pin to communicate with the primary device. In other words, once an identifier is configured to contact a particular pin by the placement of a cap in a particular hole therein, the cap does not allow the passage of the pin therethrough thereby forcing the pin to retract into the base component. In such a manner, no other identifier amongst the stack of identifiers fitted onto the same pin array can utilize the same pins in their pin/cap configurations. This is best seen in the illustration of FIG. 5 which is a top view of the base component 16 of FIG. 1 whereupon identifiers 10A, 10B, and 10C have been placed. FIG. 6 illustrates the cross-sectional view of FIG. 5 taken at the slice as indicated therein in order to show that height 'h' of the base component's pin array should be sufficient to hold the individual identifiers 10A, 10B, and 10C, shown alternatively with varying widths fitted thereupon and to show communication means, collectively at 22, for communicating with the primary device. Also shown in FIG. 6 at 50 are tension means in contact with the base of each of their respective pins such that tension is continuously exerted vertically to the base of each pin in contact therewith to push said pin up through the base component such that the pin remains in contact with its respective cap. In the embodiment illustrated, the tension means are housed in a series of recesses located in a housing. The housing can either be separate from the primary unit and the base component or built integral with either or both. Each of the individual lines 22 are electrically connected to a contact 51 to enable closed circuit detection. Tension means are also preferably of a conductive material so as to enable electric communication between the base of each pin and its associated line, collectively shown as 22.

Still referring to FIG. 6, note that with respect to identifier 10A, caps 20*f* and 20*b* therein contact the top of each of their respective pins and push their pins down through the base component into the housing for the tension means. With respect to identifier 10B, cap 30*g* contacts the top of its respective pin thereby causing that pin to retract. With respect to identifier 10C, caps 40*b* and 40*f* are fitted onto their respective pins which cause those pins to retract to an even lesser degree, as illustrated. It should be understood that other tensioning means other than the illustrated springs, such as pistons or potentiometers or a combination of functionality is envisioned herein and is to be considered within the scope of the present invention.

Figure 7:
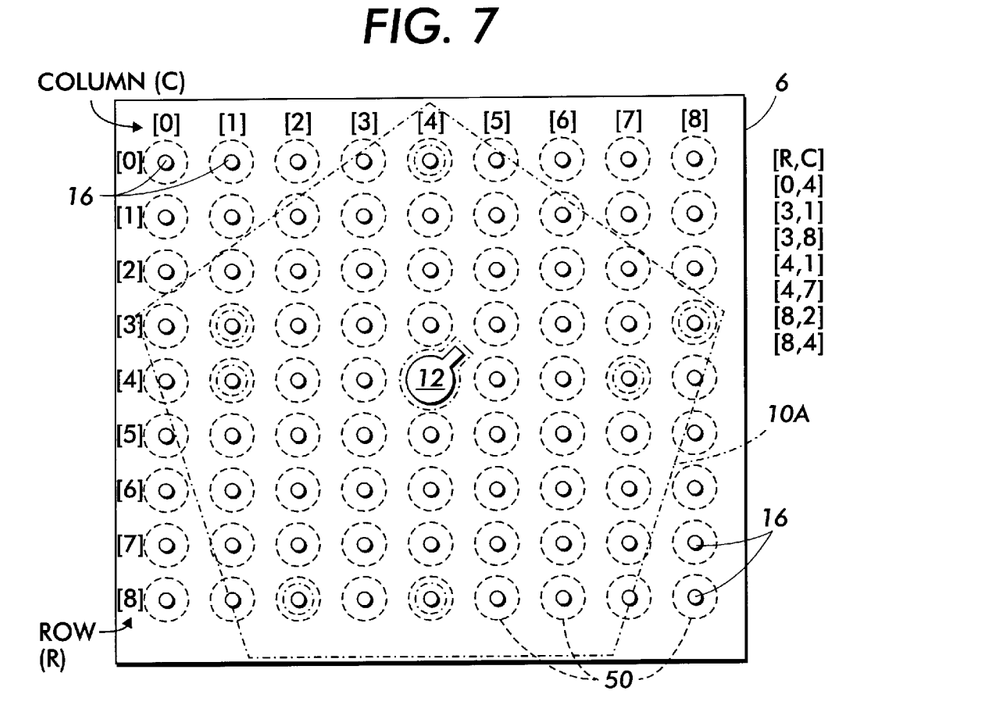
FIG. 7 is a top view of the base component 16 of FIG. 1 whereon a row and column have been labeled and numbered such that a matrix of the locations of capped holes on the pentagonal shaped identifier 10A of FIG. 2 can be obtained.

As to how the primary device or other pin/cap detection means identifies which identifiers have been pressed onto the pin array of the base component, attention is now directed to FIG. 7 which illustrates the apparatus of the present invention wherein base component 6 has the pentagonal shaped identifier of FIG. 3, fitted thereon. In the embodiment illustrated, base component 6 comprises a platform with a 9×9 array of conductive pins, shown collectively at 16, each pin being labeled from 0 to 8. Each pin passes through the fitted identifier when the identifier was oriented correctly and then pressed down onto pin array. Proper orientation of the identifier onto the pin array was ensured by keyed center post 12.

A method of detection is herein disclosed utilizing the fact that no two caps contact the same pin by the uniqueness of each identifier's cap configuration and the fact that the cap prevents subsequently placed identifiers from utilizing the same pin by prohibiting the passage of the pin therethrough. Starting at the upper left most pin, columns are identified thereon as those pins going across the array of retractable pins from left to right and rows being identified as going down the array from top to bottom, as shown. As such, the placement of pentagonal identifier onto the pin array has enabled pin/cap contacts at [row, column] locations configured at [(0,4), (3,1), (3,8), (4,1), (4,7), (8,2), (8,4)] corresponding to caps 20*c*, 20*f*, 20*a*, 20*e*, 20*b*, 20*d*, and 20*g* respectively. Similarly and with reference to FIG. 5 and referring to the overlay of the triangular identifier of FIG. 3, locations [(3,4), (4,3), (4,5), (5,3), (5,4), (7,3), (7,5)] corresponding to caps 30*g*, 30*f*, 30*a*, 30*e*, 30*b*, 30*d*, and 30*c* respectively comprises this identifier's particular pin/cap configuration. With reference to FIG. 5 and referring to the overlay of the square identifier of FIG. 4, locations [(2,3), (2,4), (2,5), (3,3), (3,5), (6,4)] corresponding to caps 40*c*, 40*d*, 40*e*, 40*b*, and 40*a* respectively comprises this identifier's pin/cap configuration.

First, a polling of each of the pins in the 9×9 array of pins occurs and a detection process is performed in order to determine which pin/caps contacts within the entire pin array have closed circuits, as discussed above. The detection of closed circuits is well known in the arts. The primary device then assembles, or is otherwise provided by the detection process, designations of the individual rows and columns of the closed circuit pin/cap contacts detected over the entire pin array. These are thus given by: [(0,4), (2,3), (2,4), (2,5), (3,1), (3,3), (3,4), (3,5), (3,8), (4,1), (4,3), (4,5), (4,7), (5,3), (5,4), (6,4), (8,2), (8,4)]. It should be understood that all the primary device knows at this point is that these locations are considered closed circuits but it has yet to determine which identifiers these pin/cap combinations reference.

A comparison procedure is initiated wherein the primary device takes the first detected location in the set of all detected locations, in this instance (0,4), and finds which identifiers in its database of known identifiers are configured to have a cap at this array location. For example, let's suppose that the primary device finds two identifiers stored within its database which have a configuration utilizing the (0,4) location for one of its caps. One identifier in its database has the configuration of locations [(0,0), (0,4), (3,1), (7,7)] and the other is our pentagonal identifier configured to utilize the array locations [(0,4), (3,1), (3,8), (4,1), (4,7), (8,2), (8,4)], as indicated above. For each matched identifier found for a specific detected array location, all the stored locations associated with each matched identifier are compared against the list of detected locations in order to find a completely matched set. Comparing, at location (0,0) of the first matched identifier, the primary device determines that this location was not detected so it throws that identifier out as not being a match since not all of that identifier's pin/cap array locations exist in the set of detected locations. The primary device compares the remaining array locations corresponding to its second matched identifier which also matched at detected location (0,4). Continuing, the primary device determines that within the set of detected locations, a match is found for each of the pentagonal shaped identifier's locations stored in its database. Thus, the pentagonal identifier has been identified. The primary device then removes or otherwise flags those locations in the set of detected locations associated with the pentagonal identifier as being accounted for. Thus, the following set of detected locations is generated wherein locations already associated with the pentagonal identifier (indicated by underscoring) are shown: [(0,4), (2,3), (2,4), (2,5), (3,1), (3,3), (3,4), (3,5), (3,8), (4,1), (4,3), (4,5), (4,7),(5,3),(5,4), (6,4), (7,3), (7,5), (8,2), (8,4)]. Removing the flagged locations from the set of detected locations generates the following: [(2,3), (2,4), (2,5), (3,3), (3,4), (3,5), (4,3), (4,5), (5,3), (5,4), (6,4), (7,3), (7,5)]. Moving to the next location in the set of detected locations, that being location (2,3), the primary device again searches its database for known identifiers whose configurations utilize the (2,3) location. Let's assume that in this iteration the primary device finds three identifiers in its database with configurations utilizing the (2,3) location. One matching identifier has stored locations [(1 ,3), (2,3), (5,6), (7,4), (8,8)], for example. Another matching identifier has stored locations [(2,3),(2,4), (5,5), (5,8), (7,1)], for example, and, lastly, our square identifier's locations [(2,3), (2,4), (2,5), (3,3), (3,5), (6,4)] are also retrieved. Again, for each matched identifier found in its database, the primary device compares all the stored locations configured therewith against the remaining locations in the set of detected locations in order to find a completely matched set. For the first identifier found matching the (2,3) location no detected location corresponds to its (1,3) location. Therefore, this retrieved identifier is not a match and is consequently tossed out. Moving on to the second identifier found matching the (2,3) location, the (2,4) matches but the (5,5) does not. Therefore, this identifier is also not a match and is discarded. Moving on to the third identifier found matching the (2,3) location (our square identifier), the primary device determines that all the stored locations configured for this identifier can be found in the set of remaining (non-flagged) detected locations. Thus our square identifier is a match. Next, the locations associated with the square identifier are then flagged (indicated once again by underscoring) in the set of detected array locations. This generates the following: [(2,3), (2,4), (2,5), (3,3), (3,4), (3,5), (4,3), (4,5), (5,3), (5,4), (6,4),(7,3), (7,5)]. Again, removing the flagged locations from this set produces the following: [(3,4), (4,3), (4,5), (5,3), (5,4), (7,3), (7,5)]. Next, the primary device then searches its database for known identifiers whose configurations match at the (3,4) array location. Let's assume, for brevity, that there is only one matched identifier utilizing the (3,4) location found in the database and it happens to be our triangular identifier with stored locations [(3,4), (4,3), (4,5), (5,3), (5,4), (7,3), (7,5)]. A comparison by the primary device of the triangular identifier's configured array locations against the set of detected locations indicates a complete matched. When these matched locations are then removed from the set of remaining detected locations, the set becomes empty. Therefore, all detected pin/cap array locations have been accounted for. As such, all identifiers have been properly identified. In the instance wherein no match can be found in the database of stored known identifiers and their respective pin/cap configurations for a location in the set of detected locations, the primary device can go into an alarm condition or initiate a predefined set of processes and/or procedures to indicate that a fault condition has occurred.

In summary, what is disclosed is a base component comprising an array of pins with each pin retractable into said base. A keyed center post fixed to the base component is utilized thereon to ensure proper orientation and placement of the identifiers onto the pin array. Individual identifiers are preferably made of a non-conductive material are also disclosed wherein each identifier comprises an array of holes each in alignment with a pin in the pin array of the base component. A keyed center hole in each identifier having a conductive sleeve is provided through which the keyed center post passes. Each identifier is specifically and uniquely configured with at least one conductive cap placed in a predetermined hole or pattern of holes such that no two caps on separate identifiers contact the same pin when fitted onto the pin array. Wiring associated with each identifier electrically connects each conductive cap with the sleeve positioned around the identifier's keyed center hole. A closed circuit is enabled between the primary device up through wiring leading to each individual pin, through each pin/cap contact, through the wiring associated with that identifier and over to the center alignment post/sleeve contact, down through the center pin itself and back.

A method is also disclosed wherein the primary device can determine which identifiers have been placed onto the pin array comprising the first step of polling the individual pins in the array of retractable pins and determining which pins have closed circuit configurations. The detection process preferably returns a set of pin/cap locations in [row, column] format which defines the locations of the individual pins on the pin array. A first location is then extracted from the returned set of detected locations. Known identifiers and their defined set of pin/cap locations stored in a database of known identifiers are selected which have a location matching the first extracted detected location's [row, column] values. Identifiers which have one location matching the extracted detected location are then retrieved from the database of known identifiers as candidates requiring further analysis. For each of the determined identifiers retrieved from the database of stored identifiers and their respective pin/cap [row, column] locations, a process would then step through the stored locations for each of the retrieved identifiers and, through a comparison technique, determine which specific identifier has all of its stored locations in common with locations in the set of detected locations. Since, no two identifiers, when pressed onto the pin array, are allowed to utilize the same pin/cap location, the full set of locations for one of the retrieved stored identifiers will be a subset of the set of detected locations. If one location from the set of stored locations for any of the retrieved identifiers does not match any of the locations from the set of detected locations, then that identifier is thrown out or otherwise considered not to be a match and is therefore not one of the identifiers which has been fitted onto the pin array. When it is determined by comparison that each location contained in the entire set of a retrieved identifier's locations have a match in the set of detected locations, then that identifier is acknowledged and those matching locations in the set of detected locations are then flagged as having been accounted for or are alternatively removed from the set of detected locations. The set of detected locations would now contain remaining detected locations for other identifiers to be matched with. The process repeats itself by then extracting another location from the set of detected locations. Identifiers in the database of stored identifiers are retrieved which have one location matching the extracted location. For each location in the set of each of the retrieved identifiers, a comparison is made to again determine which retrieved identifier's set of stored locations is considered a subset of the set of remaining or non-flagged detected locations. Identifiers are thrown out which do not have a complete match and a single identifier is identified which has all of its stored locations matching locations within the set of detected locations. This identifier is then otherwise acknowledged. Those matching locations within the set of detected locations corresponding to the recently acknowledged identifier are then flagged as having been accounted for or are alternatively removed from the set. The process again repeats itself until the set of detected locations is empty, i.e., all detected locations have been accounted for and all the identifiers have been acknowledged. In the instance wherein no match can be found in the database of stored identifiers and their respective pin/cap locations for one or more detected locations in the set of detected locations, an alarm condition can be set or a predefined set of processes and/or procedures can alternatively be initiated to indicate a fault condition.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

What is claimed is:

1. A keying apparatus in communication with a primary device used for identification purposes prior to said primary device subsequently enabling additional functionality, said apparatus comprising:
   a) a base component affixed to a housing, and having an array of holes through which a set of retractable conductive pins slidably traverse, said pins having a top end protruding through said base component and having a base end individually contacting spring tensioning means positioned within said housing, said tensioning means having a first end for exerting an upward force onto said pin base so as to continuously push said pins through said holes in said base component, said pins in communication with said primary device;
   b) at least one identifier having a plurality of holes therethrough such that said base component's retractable pins pass through a subset of said identifier's holes aligned therewith and wherein said identifier has at least one of said holes plugged with conductive capping means which blocks that hole's respective pin from passing therethrough thereby forcing each blocked pin to retract through said base component into said housing and exerting a downward force when said identifier is fitted onto said pin array;
   c) means for ensuring proper orientation and alignment of said identifier's holes with respect to said array of pins prior to said identifier being pressed onto said pin array;
   d) means for communicating from said conductive capping means to said primary device a closed circuit status for each of said pins contacting each of said capping means; and
   e) means for determining specific identifiers by assembling a set of detected array locations having said communicated closed circuit status for the respective pin and comparing said set of detected array locations and known identifiers stored in a database.

2. An apparatus as defined in claim 1 wherein said means for ensuring proper orientation comprises at least one post affixed to said base component or said identifier and having at least one corresponding hole through the other of said base component or said identifier through which said post passes so as to properly orient said identifier with respect to said pin array prior to the proper placement thereon.

3. An apparatus as defined in claim 2 wherein at least one portion of said post is keyed and wherein said corresponding hole is also keyed so as to allow said keyed post to pass through said keyed hole in at least one correct orientation.

4. An apparatus as defined in claim 1 wherein said identifier comprises electronic circuitry so as to enable the communication of additional information by said identifier to said primary device when said identifier is placed onto said pin array.

5. An apparatus as defined in claim 1 wherein said means for determining specific identifiers comprises a Central Processing Unit (CPU) programmed to perform a comparison and identification.

6. A keying apparatus in communication with a primary device used for identification purposes prior to said primary device subsequently enabling additional functionality, said apparatus comprising:
   a) a base component affixed to a housing, and having an array of holes through which a set of retractable conductive pins slidably traverse, said pins having a top end protruding through said base component and having a base end individually contacting spring tensioners positioned within said housing, said tensioners having a first end for exerting an upward force onto said pin base so as to continuously push said pins through said holes in said base component, said pins in communication with said primary device;
   b) at least one identifier having a plurality of holes therethrough such that said base component's retractable pins pass through a subset of said identifier's holes aligned therewith and wherein said identifier has at least one of said holes plugged with a conductive cap which blocks that hole's respective pin from passing therethrough thereby forcing each blocked pin to retract through said base component into said housing and exerting a downward force when said identifier is fitted onto said pin array;
   c) an alignment contact for ensuring proper orientation and alignment of said identifier's holes with respect to said array of pins prior to said identifier being pressed onto said pin array;

d) communication lines from said at least one conductive cap to said primary device for communicating a closed circuit status for each of said pins contacting each of said at least one conductive cap; and e) a processor for determining specific identifiers by assembling a set of detected array locations having said communicated closed circuit status for the respective pin and comparing said set of detected array locations and known identifiers stored in a database.

7. An apparatus as defined in claim 6 wherein said alignment contact comprises at least one post affixed to said base component or said identifier and having at least one corresponding hole through the other of said base component or said identifier through which said post passes so as to properly orient said identifier with respect to said pin array prior to the proper placement thereon.

8. An apparatus as defined in claim 7 wherein at least one portion of said post is keyed and wherein said corresponding hole is also keyed so as to allow said keyed post to pass through said keyed hole in at least one correct orientation.

9. An apparatus as defined in claim 6 wherein said identifier comprises electronic circuitry so as to enable the communication of additional information by said identifier to said primary device when said identifier is placed onto said pin array.

10. An apparatus as defined in claim 6 wherein said processor for determining specific identifiers comprises a Central Processing Unit (CPU) programmed to perform a comparison and identification.

* * * * *